United States Patent
Penatti et al.

(10) Patent No.: US 11,386,598 B2
(45) Date of Patent: Jul. 12, 2022

(54) METHOD AND SYSTEM FOR SENSOR DATA RECOGNITION USING DATA ENRICHMENT FOR THE LEARNING PROCESS

(71) Applicants: SAMSUNG ELETRÔNICA DA AMAZÔNIA LTDA., São Paulo (BR); UNIVERSIDADE FEDERAL DE MINAS GERAIS-UFMG, Minas Gerais (BR)

(72) Inventors: Otávio A. B. Penatti, Campinas (BR); Milton F. S. Santos, Campinas (BR); Artur Jordão Lima Correia, Belo Horizonte (BR); William Robson Schwartz, Belo Horizonte (BR); Leonardo Antônio Borges Torres, Belo Horizonte (BR); Priscila Louise Ribeiro Aguirre, Belo Horizonte (BR)

(73) Assignees: SAMSUNG ELECTRONICA DA AMAZONIA LTDA., Capinas (BR); UNIVERSIDADE FEDERAL DE MINAS GERAIS-UFMG., Belo Horizonte (BR)

( * ) Notice: Subject to any disclaimer, the term of this patent is extended or adjusted under 35 U.S.C. 154(b) by 876 days.

(21) Appl. No.: 16/033,847

(22) Filed: Jul. 12, 2018

(65) Prior Publication Data
US 2019/0172232 A1 Jun. 6, 2019

(30) Foreign Application Priority Data
Dec. 6, 2017 (BR) ...................... 10 2017 026251 0

(51) Int. Cl.
| | | |
|---|---|---|
| G06T 11/20 | (2006.01) | |
| G06N 7/00 | (2006.01) | |
| G06N 3/08 | (2006.01) | |
| G06F 3/0346 | (2013.01) | |
| G06N 20/00 | (2019.01) | |

(Continued)

(52) U.S. Cl.
CPC .......... *G06T 11/206* (2013.01); *G06F 3/0346* (2013.01); *G06N 3/0445* (2013.01); *G06N 3/0454* (2013.01); *G06N 3/08* (2013.01); *G06N 7/00* (2013.01); *G06N 20/00* (2019.01); *G06N 20/10* (2019.01); *G06F 3/017* (2013.01); *G06N 5/003* (2013.01); *G06N 7/005* (2013.01)

(58) Field of Classification Search
CPC .... G06F 3/0481; G06F 3/0346; G06T 11/206; G06N 20/00; G06N 20/10; G06N 3/0445; G06N 3/0454; G06N 3/08; G06N 7/00
See application file for complete search history.

(56) References Cited

U.S. PATENT DOCUMENTS

5,884,056 A * 3/1999 Steele ............ H04N 21/234336
715/738
7,127,435 B2 10/2006 Shetty
(Continued)

*Primary Examiner* — Nicholas Augustine (57) ABSTRACT

A method and system for the recognition of sensor data, like an accelerometer and a gyroscope. The method includes data/feature enrichment before a learning process. Thus, the learning process can benefit from better data, which includes both raw sensor data and enriched data/features. As a consequence, classification models may become less complex without harming accuracy and, therefore, can be more easily deployed to mobile devices, consuming less processing power and battery.

19 Claims, 2 Drawing Sheets

(51) Int. Cl.
  *G06N 3/04*   (2006.01)
  *G06N 20/10*  (2019.01)
  *G06T 11/60*  (2006.01)
  *G06F 3/01*   (2006.01)
  *G06N 5/00*   (2006.01)

(56) References Cited

U.S. PATENT DOCUMENTS

| | | | |
|---|---|---|---|
| 2006/0120624 A1* | 6/2006 | Jojic | G06F 16/739 |
| | | | 382/284 |
| 2007/0071413 A1* | 3/2007 | Takahashi | G11B 27/28 |
| | | | 386/230 |
| 2007/0185825 A1* | 8/2007 | Ito | G06N 3/0445 |
| | | | 706/30 |
| 2015/0077323 A1* | 3/2015 | Ramaswamy | G06F 3/0304 |
| | | | 345/156 |
| 2018/0296281 A1* | 10/2018 | Yeung | A61B 1/00009 |
| 2019/0121341 A1* | 4/2019 | Celia | G06N 20/00 |
| 2019/0324436 A1* | 10/2019 | Celia | H04L 1/0002 |
| 2019/0385177 A1* | 12/2019 | Faith | G06Q 30/0269 |
| 2020/0130192 A1* | 4/2020 | Ogawa | B25J 9/1692 |
| 2020/0316773 A1* | 10/2020 | Izhikevich | B25J 9/161 |
| 2021/0280056 A1* | 9/2021 | Julian | G08G 1/0129 |

\* cited by examiner

| Feature | Baseline - Chen and Xue – "A deep learning approach to human activity recognition based on single accelerometer" (*IEEE International Conference on Systems, 2015*) | Proposed method | Proposed method (with data augmentation) |
|---|---|---|---|
| Raw signal | 72.2 | 75.2 | 77.6 |
| Pitch and Roll | 67.3 | 71.5 | 73.5 |
| Translational acceleration | 68.8 | 69.9 | 75.9 |
| Concatenation | 74.8 | 76.2 | 79.3 |

METHOD AND SYSTEM FOR SENSOR DATA RECOGNITION USING DATA ENRICHMENT FOR THE LEARNING PROCESS

CROSS-REFERENCE TO RELATED APPLICATIONS

This application claims the foreign priority benefit of Brazilian Patent Application No. 10 2017 026251 0, filed on Dec. 06, 2017 before the Brazilian Intellectual Property Office, the disclosure of which is incorporated herein by reference.

BACKGROUND

1. Field

The present invention refers to a new method for sensor data recognition using enriched data for machine learning algorithms.

Initially, the present invention can be embedded into smart phones and smart watches to provide them with a better (more accurate and less complex) solution for the recognition of human activities based on inertial sensors. One possible application that can use the invention is the wellbeing framework (for example, Samsung Health®). The recognition algorithms running on the wellbeing framework can benefit from the present invention in order to generate better predictions of user activities. In addition, algorithms implemented in SensorHub can make use of the present invention to obtain better recognition accuracies. Another example of possible use of the invention is in the recognition of activities of smart watches, such as Samsung Gear S3. It is known that many smart watches sometimes confuse activities like riding a bike and driving a car. The present invention can be an alternative method to improve the recognition accuracy of existing algorithms.

The invention can also benefit and enable personalized services, in which the user activity behavior can be monitored. Therefore, services and recommendations can be offered based on their personalized profile of user activities.

In addition to inertial sensors, the invention can also benefit the recognition of other types of sensor data, including, for example, humidity, temperature, proximity, pressure, smoke, gas, sound, acoustic, vibration, and others. Therefore, devices equipped with sensors, like smart glasses, VR/AR headsets, smart belts, refrigerators, air conditioners, IoT connected devices and others can benefit of the invention if their data need to be recognized by machine learning algorithms.

2. Description of Related Art

With the recent popularity of mobile devices, like smart phones and smart watches, many new applications become possible. People hold and use their devices about a whole day and, as such devices are equipped with inertial sensors like accelerometers and gyroscopes, many new inferences about user behavior and understanding become feasible. Therefore, the recognition of inertial sensor data from mobile devices has become an interesting topic nowadays.

The recognition of inertial sensor data can provide new ways of understanding people behavior, create new ways of interaction and enable possibilities related to personalized services. The recent increasing power of devices, the new capabilities for information storage and the raise of new machine learning algorithms are also making it feasible to have real artificial intelligence on the market.

In addition to inertial sensors, there is a high availability of other types of sensors, including humidity, temperature, proximity, pressure, smoke, gas, sound, acoustic, vibration, and others. Many environments nowadays are equipped with a large of number of sensors, generating a huge amount of sensor data that can be analyzed and recognized.

Traditional recognition systems for inertial sensor data, especially for inertial sensors, are based on a common pipeline. This pipeline is composed of extracting time-domain and/or frequency-domain features from raw sensor data and then using such features with machine learning algorithms. Common time-domain features are based on statistical measures like mean, standard deviation, root mean square, histograms, etc. Frequency-domain features are based on the Fourier transform.

The pipeline explained above has been used for many years; however, it presents some drawbacks. One of them is that the process to find the best features to represent the data often requires a human specialist. Recently, with the raise of deep learning techniques, an end-to-end learning process has become the state-of-the-art for recognition. In this process, features and classifiers are learned together, so the machine is responsible to obtain the best features for the data. The raw data can be used as input and the final output is the predicted category.

Traditional (shallow) and deep learning processes have their positive and negative aspects. For instance, traditional learning processes are usually simpler and easier to port to mobile devices. However, they are usually less accurate. On the other hand, deep learning processes are very accurate, but they are usually very expensive computationally.

It is desired to have more simple and accurate solutions to port them to real-world applications on mobile devices. This objective can be achieved by combining the benefits of both classification pipelines (shallow and deep) and/or improving the pipelines by introducing innovative elements, like proposed in the present invention.

The following prior-art documents are closer to the present invention, but they do not have the advantages listed below.

Initially, according to an embodiment of the present invention, the data/feature enrichment step generates images from the input sensor data.

Many existing scientific papers use Recurrence Plots (RP) as a tool for representing sensor or time-series data as images and then apply Recurrence Quantification Analysis (RQA) to obtain information from the plots: "*Are gait variability and stability measures influenced by directional changes?*" (journal BioMedical Engineering On Line, Riva et al., 2014); "*Convulsive seizure detection using a wrist-worn electrodermal activity and accelerometry biosensor*" (journal Epilepsia, volume 53, number 5, Poh et al., 2012); "*Recurrence quantification analysis of gait in normal and hypovestibular subjects*" (journal Gait & Posture, volume 35, number 1, pages 48-55, Labini et al., 2012); "*Comparison of recurrence plot features of swallowing and breath sounds*" (journal Chaos, Solitons & Fractals, volume 37, number 2, pages 454-464, Aboofazeli and Moussavi, 2008); "*Modelling techniques for analysis of human activity patterns*" (IEEE International Conference Intelligent Systems, pages 275-280, Holloway et al., 2012); and "*Recurrence quantification analysis features for environmental sound recognition*" (IEEE Workshop on Applications of Signal Processing to Audio and Acoustics, Roma et al., 2013).

In our approach, Recurrence Plots are only one of the possibilities to enrich the input data. The main difference of RQA and the subject matter of the present invention is that many works that employ RQA do not employ machine learning classifiers to the data. Other differences rely on the type of data generated during the processing of RQA and the present invention. RQA usually generates low dimensional data (often a single numerical value for each recurrence plot). The present invention pre-processes input sensor data to have more information, resulting in high dimensional data.

Some existing works do use RQA with machine learning classifiers. Poh et al. in "*Convulsive seizure detection using a wrist-worn electrodermal activity and accelerometry biosensor*" (journal Epilepsia, volume 53, number 5, 2012), uses RQA to extract features from RPs with SVM as classifier aiming at classifying accelerometer data of epileptic seizures. The present invention is more general in various aspects, including the possibility to use multiple data/feature enrichment techniques, the ability to combine enriched data/features together with raw data/features to be input of the learning phase, the ability to consider multiple sensors and devices, etc.

Kulkarni and Turaga, in "*Recurrence textures for human activity recognition from compressive cameras*" (IEEE International Conference on Image Processing, pages 1417-1420, 2012) uses non-thresholded recurrence matrices as distance matrices and extracts an image descriptor (Local Binary Patterns—LBP) to encode their textural properties. Such features are used with a nearest neighbor classifier to classify videos of human activities captured by compressive cameras. The difference consists in the fact that Kulkarni 2012 is based on videos, while the present invention works on sensor data.

The work of Souza et al., titled "*Extracting Texture Features for Time Series Classification*" (International Conference on Pattern Recognition, pages 1425-1430, 2014) proposes the use of image texture descriptors for extracting information from RPs aiming at classifying time-series data. They use SVM as classifier and consider the tasks in the UCR Time Series Archive (UCRArchive, July 2015). This work is similar to the present invention; however, it considers only gray-level plots, while the present invention is general to use RGB plots in which each dimension refers to an axis of the accelerometer data. The present invention also presents the following properties, which are not possible in the work of Souza 2014: multiple data/feature enrichment techniques can be used; enriched data/features can be used together with raw data/features in the learning process.

The journal paper "*Fusion of time series representations for plant recognition in phenology studies*", by Faria et al. (journal Pattern Recognition Letters, volume 83, part 2, pages 205-214, 2016), proposes the use of image descriptors over RPs for plant recognition. It obtained time-series data from images taken of plants over time. Such images are segmented into regions and the regions are considered in terms of how they contribute to each R, G and B channels separately. The average pixel intensity is then computed per channel and the variation of this value over time is used as source for computing the time series. As they have one time series per color channel, it computes a recurrence plot for each channel and then combines the three plots into a single RGB plot. After that, it extracts image descriptors from the RGB plot and uses them in a classification protocol. Although this document is similar to the present invention, the present invention uses data from mobile inertial sensors (e.g., accelerometers) as source for the time-series data. It is also considered the task of activity recognition and the present approach is more general on how to obtain the classifier from the RPs. The present invention is also more general in the sense that other tools different from RPs can also be used for data/feature enrichment. The present invention also allows the use of enriched data/features together with raw data to be input of the learning process.

The paper titled "*Exercise Motion Classification from Large-Scale Wearable Sensor Data Using Convolutional Neural Networks*", by Um et al., 2016, proposes a CNN which has as input the signal formatted like an image. To generate this image, it is used a different reshape style, which leads to different convolutions with different neighboring elements. This paper differs from the present invention by the fact that the method does not use enriched features, but only the raw feature as input. The present invention, on the other hand, uses both raw data and enriched features as input to the learning process simultaneously. The present invention also works with other data/feature enrichment techniques besides image generation.

The paper titled "*A deep learning approach to on-node sensor data analytics for mobile or wearable devices*" (IEEE Journal of Biomedical and Health Informatics), by Ravi et al., 2017, proposes an approach to combine handcrafted features, referred to as shallow features, with features learned by Convolutional Neural Networks (CNNs). Both features are extracted from accelerometer and gyroscope. After extracting these two types of features, a unified deep neural network is trained, using these features concatenated, to classify the activities. For the deep learning module, the paper generates spectrograms from the sensor data, which can be understood as a data/feature enrichment step. However, the method in the paper has the following differences related to the present invention. First, the present invention allows the use of original raw data together with enriched data for the input of the learning process (the convolutional layers), while the method in the paper uses only the enriched data/features and later present the sallow features to the learning approach. Second, the shallow and deep features are combined in the method in the paper, but not in the present invention. The present invention works with such features independently that are presented directly to the deep learning algorithm, allowing it to extract the important information. Third, the present invention is more general in terms that other data/feature enrichment techniques can be used; the paper assumes only the use of spectrograms. And fourth, data/feature enrichment step of the present invention can be used for both shallow and deep learning process, while the method in the paper applies data/feature enrichment to only the deep learning process.

The paper titled "*Deepmotion: a deep convolutional neural network on inertial body sensors for gait assessment in multiple sclerosis*" (Wireless Health—WH, IEEE) by Gong et al., 2016, proposes a CNN to learn gait patterns aiming to find walking impairment. This proposed CNN consists of a convolutional layer, max-pooling and a fully connected layer to perform the classification. The method in the paper computes multichannel spectrograms and uses these spectrograms as input for the CNN. The computation of the spectrograms can be seen as a data/feature enrichment process, similar to one embodiment of the present invention. However, the method in the paper does not consider the possibility of using the raw sensor data as input for the CNN together with the enriched data. In addition, the present invention is more general and considers multiple data/feature enrichment steps, not only the generation of images from the sensor data. Besides that, the present invention is targeted for human activity recognition considering multiple activities and not only for gait analysis, as the method in the paper.

In the following paragraphs, it is highlighted the differences of the present invention specifically to existing methods that employ *Convolutional Neural Networks* (CNNs or ConvNets) to obtain features/classifiers for the input sensor data. This category of existing methods represents another possible embodiment of the present invention. The invention, however, includes the innovative component of data/feature enrichment, which is not present in the works described below.

The patent document WO 2016100814 A1 titled "MULTI-MODAL SENSOR DATA FUSION FOR PERCEPTION SYSTEMS", filed on Dec. 18, 2015, by UNITED TECHNOLOGIES CORPORATION performs sensor fusion, e.g., visual (RGB images), inertial (gps) and infrared (short wavelength infrared). The method applies a CNN on the patches of the data. The present invention proposes the use of data/feature enrichment techniques to enrich data for the learning process and such enriched data can be used together with raw data in the learning process. As the method in the patent does not consider data/feature enrichment, it is different from the present invention.

The patent document KR 20160069834 A titled: "APPARATUS AND METHOD FOR TRAINING CONVOLUTIONAL NEURAL NETWORK FOR APPROXIMATION OF CONVOLUTIONAL NEURAL NETWORK", published on Jun. 17, 2016, by SAMSUNG ELECTRONICS CO, LTD., proposes an approach to generate a simplified and approximate version of a CNN. It changes some CNN parts to achieve similar results in a more efficient way. The present invention proposes a new processing pipeline including a data/feature enrichment step which can then be used in the learning process together with the original raw data. The present invention does not propose simplification in CNNs and is robust to work with other techniques besides CNNs.

The paper titled "*Deep Convolutional and LSTM Recurrent Neural Networks for Multimodal Wearable Activity Recognition*" (Sensors 2016, 16(1), 115) by Ordónẽz and Roggen, proposes a deep learning framework based on CNN and Long Short-Term Memory (LSTM) networks focusing on human activity recognition and sensor fusion. The present invention proposes a data/feature enrichment step to enrich data/features to be the input for the learning process together with raw data. During the learning process, the present invention can make use of CNNs and also of other learning techniques, including the one proposed in Ordonez et al. 2016. Therefore, the present invention is different than the method disclosed in the paper.

The paper titled "*Temporal Convolutional Networks: A Unified Approach to Action Segmentation*" (Computer Vision-ECCV 2016 Workshops) by Lea et al., 2016, presents a method to unify the learning process considering temporal relationships. However, the present invention proposes to include a data/feature enrichment step before the learning process to enable simpler learning techniques to be used. Such enriched data/features can be used together with the raw data in the learning process proposed in the present invention.

The paper titled "3*D Convolutional Neural Networks for Human Action Recognition*" (IEEE transactions on pattern analysis and machine intelligence) by Ji et al., 2013, proposes a 3D CNN, which computes features from spatial and temporal dimensions on videos. The present invention, however, considers sensor data.

The paper titled "*Sequential deep learning for human action recognition*" (International Workshop on Human Behavior Understanding) by Baccouche et al., 2011, proposes a two-step neural-based deep model for human action recognition on videos. The final model consists of a CNN followed by a recurrent neural network. Our proposed model, however, considers inertial sensor data.

The paper titled "A survey on human activity recognition using wearable sensors" (IEEE Communications Surveys and Tutorials) by Lara and Labrador, 2013, surveyed the advances in the wearable systems, but do not propose a novel method to address the human activity recognition based on sensor data.

The papers "*Human activity recognition with smartphone sensors using deep learning neural networks*" by Ronao and Cho, 2016—Expert Systems With Applications 59 (2016) 235-244, "*Evaluation of deep convolutional neural network architectures for human activity recognition with smartphone sensors*" by Ronao and Cho, 2015—Proc. of the KIISE Korea Computer Congress, and "*Deep convolutional neural networks for human activity recognition with smartphone sensors*" by Ronao and Cho, 2015—International Conference on Neural Information Processing, investigate CNN parameters and configurations aiming to find the best setups to represent activities from inertial sensor (accelerometer and gyroscope) of smartphones. The papers directly use the sensor data as input for the learning process. The present invention, however, proposes the use of a data/feature enrichment process to obtain better data to be input of the learning process.

The paper titled "*Human activity recognition based on a sensor weighting hierarchical classifier*" (Soft Computing (2013) 17:333-343) by Banos et al., 2013, proposes a method for fusion of binary classifiers, in which both are learned by a one-against-all strategy. The method takes in the advantages of the hierarchical decision and majority voting models. However, the method of this paper does not propose a data/feature enrichment step to obtain better data for the learning process, as the present invention.

The paper titled "*Two-stream convolutional networks for action recognition in videos*" (Advances in neural information processing systems) by Simonyan and Zisserman, 2014, proposes a deep learning approach for action recognition on videos. However, the present invention is devoted to sensor data.

The paper titled "*The Very Deep Multi-stage Two-stream Convolutional Neural Network for Action Recognition*" (3rd International Conference on Mechatronics and Information Technology—ICMIT) by Gao and Zhang, 2016 proposes a deep learning approach for action recognition on videos. Therefore, as its approach is not suitable for sensor data, it is different than the present invention.

The paper titled "*DeepSense: A Unified Deep Learning Framework for Time-Series Mobile Sensing Data Processing*" by Yao et al., 2017, proposes integration between CNNs and recurrent neural networks (RNNs) to exploit local interactions among similar mobile sensors, merge local interactions of different sensory modalities into global interactions, and extract temporal relationships to model signal dynamics. The method in the paper, however, does not include a data/feature enrichment step to obtain better data for the learning process; therefore, it is different than the present invention.

The paper titled "*Convolutional neural networks for human activity recognition using multiple accelerometer and gyroscope sensors*" (International Joint Conference on Neural Networks—IJCNN) by Ha and Choi, 2016, proposes to use CNNs for human activity recognition based on inertial sensors. The present invention proposes the use of data/feature enrichment techniques to obtain better data for the learning process. As the method in the paper does not consider data/feature enrichment, it is different than the present invention.

The paper titled "*Action recognition with trajectory-pooled deep-convolutional descriptors*" (IEEE Conference on Computer Vision and Pattern Recognition—CVPR) by Wang et al., 2015, proposes a ConvNet to combine both handcrafted and deep features. However, throughout their work, the method is evaluated in the context of human recognition based on images/videos only and does not involve inertial data as our work, which represents a significant difference.

The paper titled "*Sensor-based Gait Parameter Extraction with Deep Convolutional Neural Networks*" (IEEE Journal of Biomedical and Health Informatics) by Hannink et al., 2017, proposes two types of ConvNets, aiming at modeling the gait pattern from accelerometer and gyroscope data. The first one determines a complete set of output variables with a combined model. The second one estimates each output variable independently with an ensemble of networks. The present invention aims at recognizing human activities, assigning a category to the input data. The method in the paper, however, obtains parameters of walking movements (gait) and does not classify the input data into categories. In addition, the present invention proposes the use of a data/feature enrichment step to obtain better data for the learning process. This step is not present in the mentioned paper.

The paper titled "*Deep Recurrent Neural Network for Mobile Human Activity Recognition with High Throughput*" by Inoue et al., 2016, investigates several parameters of a deep recurrent neural network aiming to show as these parameters can affect the accuracy and performance. The method in paper does not have a data/feature enrichment step, working directly on the raw sensor data. The present invention, however, proposes a data/feature enrichment step aiming to obtain better data for the learning process.

The paper titled "*Convolutional neural networks for human activity recognition using mobile sensors*" (6th International Conference on Mobile Computing, Applications and Services—MobiCASE) by Zeng et al., 2014, proposes a CNN to learn features for activity recognition from accelerometer data. The results showed that the proposed method outperforms statistical features and PCA-based features. The present invention proposes the use of a data/feature enrichment step to obtain better data for the learning process. The method in the paper, however, does not have a similar step.

The paper titled "*Hierarchical Activity Recognition Using Smart Watches and RGB-Depth Cameras*" (Sensors, 16(10), 1713) by Li et al., 2016, classify daily activities by combining sensor data and RGB-depth images. The idea of using RGB depth images is to construct the human's skeleton structure to use this information as a cue to discriminate the activities. To represent the activities from sensor data, the authors employ handcrafted features, e.g., mean, variance and spectral energy. The main difference to the present invention is that the present invention considers only sensor data, while the paper combines sensor data and RGB-D images. The present invention also proposes the use of a data/feature enrichment step that is not present in the method of the paper.

The paper titled "*Inertial Sensor Based Modeling of Human Activity Classes: Feature Extraction and Multi-sensor Data Fusion Using Machine Learning Algorithms*" (eHealth 360°—Volume 181 of the series Lecture Notes of the Institute for Computer Sciences, Social Informatics and Telecommunications Engineering, pp 306-314) by Zebin et al., 2017, proposed a framework to classify activities using classifiers as SVM and artificial neural networks. These classifiers are learned from sensor data, which are represented by handcrafted features. The main difference regarding the present invention is that the method at the paper does not consider the use of a data/feature enrichment step in order to obtain better data for the learning process. In addition, the method of the present invention is more robust to use not only handcrafted features but also to learn the best features for the data by using deep learning techniques.

The paper titled "*Detecting Activities of Daily Living from Low Frequency Power Consumption Data*" (Proceedings of the 13th International Conference on Mobile and Ubiquitous Systems: Computing, Networking and Services) by Tang and Ono, 2016, employed the Markov on the power consumption (electrical appliances) to discriminate activities. The present invention presents multiple differences. One of them is according to the essence of the data, where the present invention uses inertial sensor data, while the method at the paper considers power consumption information. Another difference is that the present invention focuses on presenting a set of data/feature enrichment methods to improve the data for the learning process.

In the following paragraphs, we describe the differences of another embodiment of the present invention to existing works.

In such embodiment, autoregressive models are employed for feature enrichment, in which we use coefficients of two-dimensional vector autoregressive models obtained from estimated wrist's attitude roll and pitch angles as features to consider for human activity recognition. These models are identified considering two different approaches, namely: (i) time-domain models; and (ii) phase plane models. No scientific paper using this Phase Plane idea was found in the prior art. The papers listed below have some similarities, but their differences to the proposed invention are explained below as well.

The paper titled "*Activity recognition from acceleration data using AR model representation and SVM*" (International Conference on Machine Learning and Cybernetics pp. 2245-2250) by He and Jin, 2008, use parameters of autoregressive (AR) models identified from accelerometer data as features to recognize human activities, employing a SVM as the classifier. This paper provides favorable comparisons with other frequency and time domain features that are commonly extracted to perform HAR.

The paper titled "*Activity recognition from accelerometer signals based on Wavelet-AR model*" (IEEE International Conference on Progress in Informatics and Computing, Shanghai, pp. 499-502) by He, 2010, the first author of the aforementioned paper has combined the same AR modeling approach with coefficients of Daubechies 3 wavelets in an attempt to improve the results obtained in 2008 by using an extended feature vector. The present invention is different in two aspects: (i) our AR models represent the time evolution of the wrist's attitude angles, which were obtained from preprocessing accelerometer's data, instead of the time evolution of the acceleration signals themselves as done by He and Jin; and (ii) together with the attitude angles time series, we have also modeled the attitude angles evolution as a trajectory in a two dimensional Phase Plane. Finally, it is worth mentioning that the present invention is also robust to handle complex activities performed by wrist' movements, and not only activities that depend on whole body movements, like the ones considered in He and Jin, 2008's or in He, 2010's papers. The method of the present invention is also more general in terms that it proposes a data/feature enrichment step that can implement multiple techniques, not only AR models. The method of the present invention also allows the use of original raw sensor data together with enriched data for the input of the learning process. Further, the method of the present invention is also more flexible to consider not only the shallow learning process but also deep learning techniques.

In the paper titled "*Accelerometer Signal-based Human Activity Recognition Using Augmented Autoregressive Model Coefficients and Artificial Neural Nets*" (30th Annual International IEEE EMBS Conference (pp. 5172-5175—British Columbia, Canada) by Khan et al., 2008, the authors have used autoregressive models for the acceleration signals time-series, instead of using the wrist's attitude angles as we have done in our invention. In addition, they have augmented the feature vector by adding, besides the AR model coefficients, the so-called Signal Magnitude Area (SMA) feature, and the Tilt Angle (TA) feature, both associated with each time window from the tri-axial accelerometer's data for each activity. In addition, they have used a standard forward Multi-Layer Perceptron (MLP) artificial neural network as the classifier, and in the present invention there is the flexibility to use traditional shallow learning approaches as well as deep learning. Also, the present invention allows the use of raw data and enriched data/features simultaneously in the learning process.

In the paper titled "*A Triaxial Accelerometer-Based Physical-Activity Recognition via Augmented-Signal Features and a Hierarchical Recognizer*" (IEEE Transactions on Information Technology in Biomedicine, 14 (5), 1166-1172), by Khan et al. 2010, the authors have continued using the approach in Khan et al., 2008, i.e. statistical features and AR model coefficients from accelerometers' time series, with minor differences. In all four papers mentioned above, only ambulation activities were investigated, and the accelerometer was attached to the subject's chest in Khan et al., 2008, Khan et al. 2010 and in Lee et al. 2011.

Only in Khan et al. in the paper titled "Exploratory data analysis of acceleration signals to select lightweight and accurate features for real-time activity recognition on smartphones" (Sensors, 2013-13 (10), 13099-13122) the authors consider accelerometers in smart phones.

Differently from the present invention, in any of these aforementioned four papers the authors do not have made use of any Phase Plane analysis, as described in the detailed description of the invention (Section 9b). The present invention is also more general regarding that it can also use as input data for the learning process both the enriched data/features and the original raw data. The present invention can also work with both shallow and deep learning approaches.

U.S. Pat. No. 7,127,435, by Honeywell International, has similarities to our proposed invention, however, its scope is much more limited than the proposed invention in terms of the enrichment techniques that can be used for data/feature enrichment. The patent applies data/feature enrichment considering only mean and standard deviation statistics of data. In addition, the patent has a strong limitation that it does not allow the use of the raw input data for the learning process; only the enriched data is used as input for the machine learning technique.

The present invention differs from U.S. Pat. No. 7,127,435, by Honeywell International, by the following differences:

does not assume and does not require data sparseness;
allows the use of raw data/features together with enriched data/features for the learning process, while the method at the patent allows only the use of enriched data in the learning process;
employs any machine learning technique, not only neural networks as the patent does;
allows the use of many data/feature enrichment techniques (including image generation, auto-regressive models) while the method at the patent enriches data by arranging it according to the mean and standard deviation statistics.

INVENTION SUMMARY

The method and system of the present invention aims at dealing with the recognition problem by combining characteristics of both of traditional (shallow) learning and deep learning processes. Such combination makes it possible to obtain more accurate classification models having low complexity and, therefore, capability to run on mobile and similar devices. The main idea of the present invention is to provide a better input data for the learning process, introducing a data/feature enrichment step.

The present invention is composed of the following steps: pre-processing of raw input sensor data in order to generate richer features; input of raw and rich data/features to the learning process; and learning of the features/classifier.

The pre-processing step uses the raw sensor data to generate richer data/features. For example, in the scenario of mobile inertial sensors, the user can compute attitude estimation features from accelerometer and gyroscope sensor data. Other possibility is to generate images that encode the properties of sensor data, like recurrence plots and phase planes. Other possibility is to use autoregressive models to obtain richer information from the input raw data. Such richer features or richer data are then used together with the raw data as input to the learning process.

The learning phase can be the traditional (shallow) learning or the deep learning process. The process will obtain the best classifier to the data. If using shallow learning, one can define a priori the features to extract from the raw/richer input data and then use a traditional machine learning classifier to obtain the final classification model. If using deep learning, features and classifiers are learned simultaneously in an integrated process. As we have richer data as input, the deep architecture can obtain better results with a less complex architecture. Therefore, the main advantage of the proposed invention is that we can obtain classification models with higher accuracy and less complexity.

BRIEF DESCRIPTION OF THE DRAWINGS

The objectives and advantages of the present disclosure will become clearer through the following detailed description of the example and non-limitative figures presented at the end of this document, wherein.

DETAILED DESCRIPTION

Scenario and Application

Figure 1:
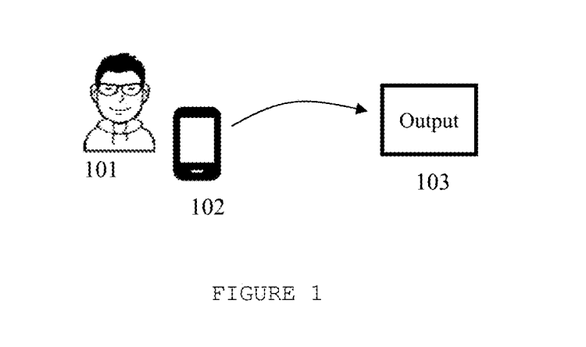
FIG. 1 discloses a scenario of a preferred embodiment of the proposed invention being used, in which we have a mobile device running the invention and a user that performs activities with the device, wherein the user activities are automatically recognized by the proposed invention, generating an output, which is the activity category.

The main goal of the present invention is the recognition of sensor data. The preferred embodiment of the present invention is the recognition of human activities based on mobile inertial sensors, like accelerometers and gyroscopes. Such sensors are commonly available in smart phones and smart watches, making it possible to recognize the user movements/activities directly in the device. A typical scenario for human activity recognition is when a user is using his devices during his daily activities. The recognition algorithms recognize the users' activities, such as sitting, standing, laying, walking, eating, drinking, climbing stairs, and others. As shown in FIG. 1, a user (101) holding or wearing a device (102) running the present invention has his activities recognized. The recognized activities are the output (103) of the present invention. The device (102) comprises a smart phone, a smart watch, a smart head phone, or any other mobile device, in which the proposed invention should be running in order to obtain the specified human activity recognition system. The present invention can also consider the use of multiple devices, such as synchronized/paired smart watches and smart phones. In addition to mobile inertial sensors, the invention is also applied to the recognition of other types of sensor data, including, for example, humidity, temperature, proximity, pressure, smoke, gas, sound, acoustic, vibration, etc. The invention can also be applied to recognize patterns in such different sensors. The present invention provides the advantage of enabling recognition systems with higher accuracy rates and low complexity than existing systems.

Description

Figure 2:
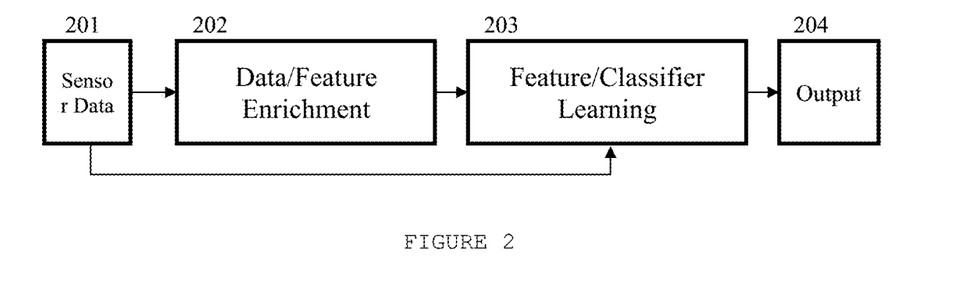
FIG. 2 discloses the pipeline of the proposed approach, having the sensor data as input, then a process to enrich input data is performed, followed by a feature/classifier learning step, and finally the output.

FIG. 2 illustrates the steps of the proposed invention. In the preferred embodiment of the invention, the input data (201) is inertial sensor data. The input data (201) is then processed (202) in order to obtain richer data or richer features to be input to the learning process (203). The learning process (203) will learn the best features and/or the best classifier for the recognition of human activities. The learned features/classifiers will be used to predict the activity type of the input data, generating an output (204), which is the recognized activity.

The input sensor data (201) can be obtained from any sensor type, including but not limited to, accelerometers, gyroscopes, barometers, magnetometers, pressure, proximity, humidity, temperature, sound, and others. Such sensors generate data along time, analogous to time-series data. The input data can be obtained from a single device (like a single smart phone or a single sensor device) or from multiple synchronized devices (like paired smart watch and smart phone devices, or a set of environment sensors). However, the solution can work for any other device having sensors, including, but not limited to, head phones, VR/AR headsets, belts, glasses, refrigerators, air conditioners, etc. Moreover, the location of the devices is not restricted to specific positions in the human body, neither to positions in the environment.

The input data (201) can be processed (202) in different ways in order to obtain richer data or richer features (202) for the learning process (203). Such processing can be, for instance, extraction of information from raw sensor data, like computation of attitude estimation features (202); can include filtering approaches, like gravity removal, noise removal, and others (202). Another processing possibility is to generate images from the sensor data (202). Such images can be Recurrence Plots (RP), which is a technique to represent the recurrence properties of time-series data. Recurrence Plots can be defined as $R(i, j) = \theta(\epsilon - \|x_i - x_j\|_2)$, where $x_t$ is said time series value in a given time t and $\theta()$ is the Heaviside step function. In other words, when the trajectory data gets close enough (i.e., within $\epsilon$) to where it has been before, a recurrence occurs. Other possibility is to represent the sensor signals in a matrix form, which can then be understood as images (202).

Other possibility to generate richer data for the learning process is to use coefficients of n-dimensional multivariate/vector autoregressive (AR) models used to represent the time evolution of estimated variables computed from measured signals, such as $y(k) = A_1 y(k-1) + A_2 y(k-2) + \ldots + A_m y(k-m)$, with $y(k)$ an n-dimensional estimated variable at the sampling k; and $A1, A2, \ldots, A_m$ are (n×n) real matrices of coefficients that are the features to be considered by a classifier.

In the preferred embodiment of the invention, the AR models are used to represent the time evolution of the estimated two-dimensional attitude vector comprised by the roll and pitch angles computed from measured acceleration signals. These models can be obtained considering two different approaches, namely: (i) time-domain models; and (ii) phase plane models. The time-domain models aim at describing how the current values of the estimated variables can be explained as functions of the past values of these very variables. The phase plane models, on the other hand, are based on the representation of the trajectory of the estimated variables, resulting from its time evolution, in an n-dimensional Euclidean space, such that each activity can be depicted as a graphical path, or graphical signature, in this space, which is divided in smaller boxes associated with a desired level of quantization (please, see the example on FIG. 5 for the case of estimated roll and pitch attitude angles from measured acceleration data). In the phase plane case, the autoregressive model aims to explain how the current position of the trajectory in a rectangular region can be explained by having previously visited different rectangular regions. In this sense, if the values of the estimated variables evolve slowly or fast, the same rectangular regions will be visited, and therefore the number and sequence of visited regions tends to be independent of the time spent in the generation of the measured signals from which the estimated values were obtained. In the preferred embodiment of the invention, the use of phase plane models makes the classification of human activities using the roll and pitch attitude angles dynamical evolution more independent of the speed with which the activity was performed. The idea of using phase planes can also be exploited in computing other features related to the shape of the trajectories for each activity.

The data/feature enrichment techniques explained above can be applied over specific time periods of the sensor data. For instance, one could compute recurrence plots over windows of time over the data, and such windows can vary from few seconds to many minutes, being overlapped or not with previous windows. The size of the window of time to be used depends on the target application. If one needs real-time classification of sensor data (just after the data is collected), smaller windows can be used (e.g., few seconds). On the other hand, if the feedback does not need to be given right after the data collection, larger windows can be used or even a combination of multiple window sizes can be used.

The enriched data/features generated are used as input for the machine learning process (203). The learning process can also make use of the original raw data in combination with the enriched data/features. The learning process can be based on traditional (shallow) schemes or on deep learning approaches.

In the shallow learning process, one can extract other features from the input data and these features will be used for the machine learning classifier for learning the best way to discriminate among sensor data categories. When computing additional features from raw sensor data, one can employ time-domain or frequency-domain features, like mean, standard deviation, histograms, peaks, correlation, features based on the Fourier transform, and others. The computed features then feed a machine learning classifier, which can be of any class of classifier, including but not limited to, Support Vector Machine (SVM), Random Forest, Naive Bayes, Nearest Neighbors, Neural Networks, and others. The classification model learned by the classifier is then used to predict the sensor data category when an input sensor data is given to the system.

In the case of using deep learning, both the features and the classifier are learned in a unified process, usually called end-to-end learning. One difference between the present invention and the existing systems is that the data used as input for the learning process in the present invention, even the deep learning process, is enriched by the data/feature enrichment step (202) explained above. In such step (202), multiple techniques can be used, like the ones explained in previous paragraphs (i.e., attitude estimation features, Recurrence Plots, features based on autoregressive models, etc.). On top of that, the enriched data/features can be used together with the raw sensor data as input for the feature/classifier learning process (203). For the deep learning process, one can employ Convolutional Neural Networks (CNN), Recurrent Neural Networks (RNN), adversarial networks, and other types of deep learning architectures. When the deep learning process is finished, the learned classifier will comprise both the procedure for feature extraction from data and the classifier for discriminating the data.

The main innovation of the present invention is the processing pipeline for sensor data recognition including the step of enriching input data for having better data for the learning process. With such improvement, the complexity of features/classifiers can be reduced and the accuracy of the system can be increased. Therefore, the proposed invention can benefit the deployment of sensor data recognition systems to devices with few resources, like processing power and memory. Another advantage provided by the present invention is the reduction of battery consumption.

Machine learning systems usually have two main steps: (i) training and (ii) use of the classification model. The training of the classifier, independently of its type, may be performed separately from the classifier use. One can train the classifier in a separate computer/server and then use the learned classification model on a mobile device, for instance. Another possibility is to have both stages (training and use) on the same location, and such locations can be a computer/server or a mobile device. The current availability of powerful tools for machine learning for mobile devices makes it possible to even train the classifier in periods of time. It is also possible to update or re-train the classification model using new added user data, in schemes related to reinforcement and/or online learning. Therefore, the proposed invention has no restriction on where the training and use phases can occur.

Figure 3:
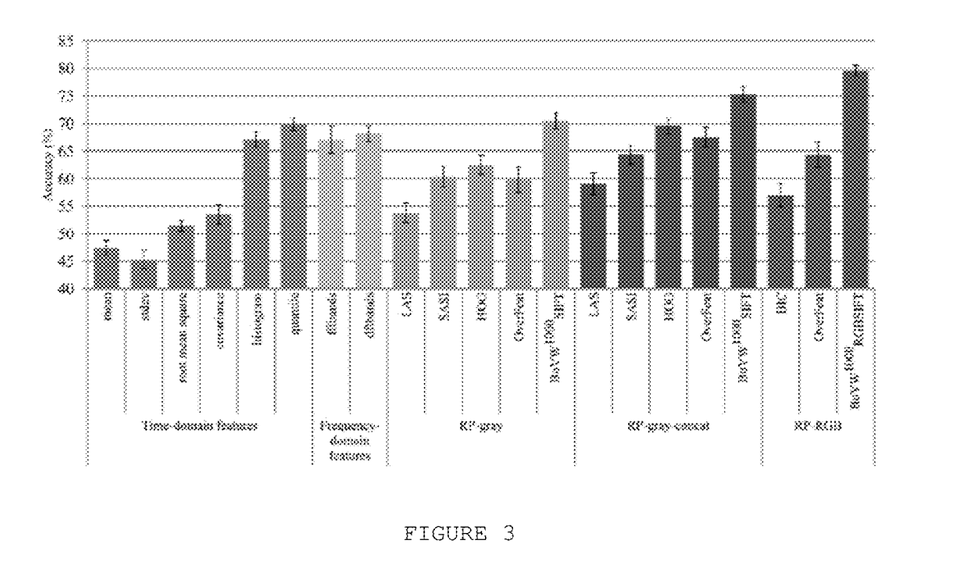
FIG. 3 discloses experimental results of one embodiment of the proposed invention, which considers the use of Recurrence Plots (RP) for enriching the input sensor data, combined with bags of visual words for representing the plots and then using support vector machine as classifier.

Experiments on sensor datasets demonstrate the improvements in accuracy over existing baselines when using the present invention. FIG. 3 shows experimental results comparing one embodiment of the present invention with baselines. Such baselines include time-domain and frequency-domain features. The embodiment whose results are shown in FIG. 3 corresponds to the computation of Recurrence Plots (RP) over sensor data, the extraction of visual features from the plots, and then the learning process with traditional shallow classifiers. The highest accuracy levels are obtained when using RGB RPs in which each channel corresponds to a different axis (x, y, and z) of the sensor data. The best features in this case consider bags of visual words based on RGB SIFT descriptors. As classifiers, the results correspond to the use of Support Vector Machine (SVM) with the linear kernel.

Figure 4:
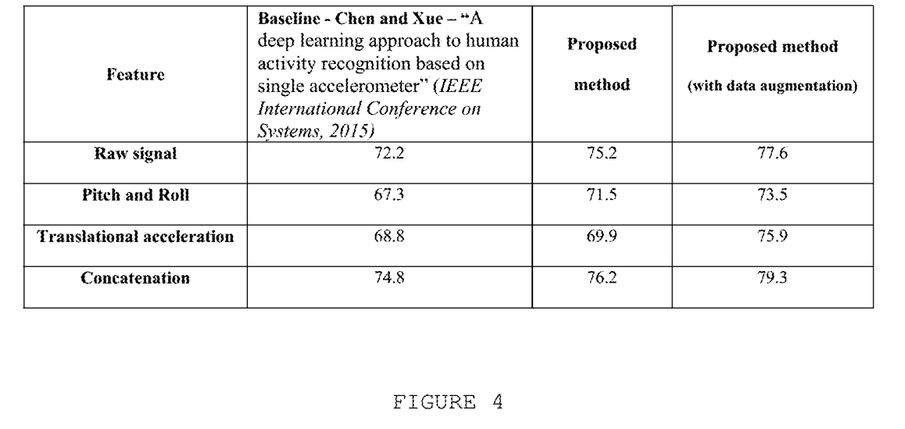
FIG. 4 discloses experimental results of one embodiment of the proposed invention, which is the use of enriched features (attitude estimation features including pitch, roll and translational acceleration) with a deep convolutional neural network and with data augmentation.

The results shown in FIG. 4 compare an existing deep learning method with another embodiment of the present invention. This embodiment considers the enrichment of raw sensor data by using attitude estimation features (pitch, roll and translational acceleration) and deep convolutional neural networks. The values correspond to the recognition accuracy (%) when using Convolutional Neural Networks (CNN) over distinct input data (each row). The table compares the results of the proposed method with an existing baseline. Results consider the classification of temporal sliding windows of 5 seconds of sensor data. It is noted in FIG. 4 that the present invention achieves the highest accuracy rates.

Figure 5:
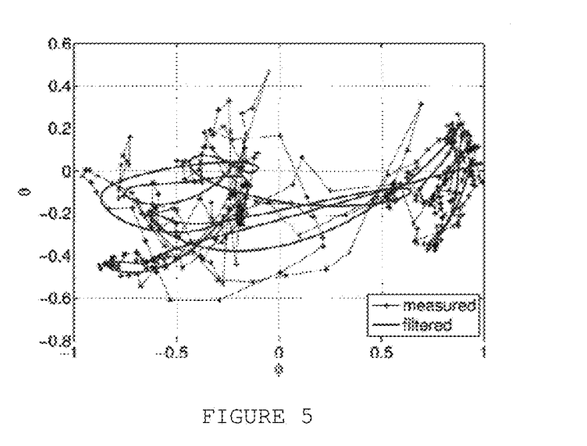
FIG. 5 discloses an example of the phase plane (wrist's pitch and roll angles) when using the coefficients of autoregressive (AR) models for the data/feature enrichment process.

FIG. 5 discloses an example of the phase plane (wrist's pitch and roll angles) when using the coefficients of autoregressive (AR) models for the data/feature enrichment process. Such curves are disclosed as a graphical signature of the movements realized by the user when performing a given activity.

In a preferred embodiment, the proposed invention can be used for the recognition of many different types of human activities, including, but not limited to: standing, sitting, laying, combing hair, brushing teeth, climbing and descending stairs, climbing and descending slopes, drinking, eating soup, eating meat, pouring water, using telephone, driving, walking, running, watching TV, and others. For using the present invention for the recognition of a given set of activities, the user only needs to provide enough training data for the learning process comprising the activities desired.

The proposed invention can run independently of specific hardware or devices. The invention can run completely in the same device that collects sensor data or can run in multiple devices. For instance, there could be a specific module, device or hardware of obtain sensor data; such sensor data can be processed for data/feature enrichment locally in the device or remotely in the cloud; the classification step can also happen in a specific device or in the cloud; and the output can be analyzed in the same device that processed the data or in another device for visualization. A system implementing the proposed invention, therefore, can be composed or not of multiple devices to execute the different steps of the invention and obtain the effects of the proposed invention.

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

The invention claimed is:

1. A method for recognition of sensor data using enriched data for a learning process based on mobile inertial sensors, the method comprising:
   receiving data from the mobile inertial sensors as input;
   obtaining data/features from input raw sensor data that is received as the input from the mobile inertial sensors;
   enriching the data/features obtained from the input raw sensor data of the mobile inertial sensors by performing pre-processing in association with the data/features obtained from the input raw sensor data and generating enriched data for use in the learning process;
   learning features/classifier based on the input raw sensor data together with the generated enriched data as input for the learning process; and
   outputting a classification information generated according to the learned features/classifier.

2. The method of claim 1, wherein the input raw sensor data is obtained during a certain period of time.

3. The method of claim 1, wherein the input raw sensor data comprises data from one of accelerometer, gyroscope, barometer, and magnetometer as the mobile inertial sensors.

4. The method of claim 1, wherein the input raw sensor data is obtained from more than one device.

5. The method of claim 1, wherein the input raw sensor data is augmented by data augmentation.

6. The method of claim 1, wherein the enriching of the data/features computes attitude estimation features including one of pitch, roll, and translation acceleration.

7. The method of claim 1, wherein the enriching of the data/features generates images from the input raw sensor data.

8. The method of claim 7, wherein the images generated from the input raw sensor data comprise recurrence plots, sensor signals in a matrix form and based on coefficients of autoregressive models.

9. The method of claim 7, wherein the images generated by the enriching of the data/features are processed in order to obtain visual features to be used in a shallow learning process.

10. The method of claim 7, wherein the images generated by the enriching of the data/features are processed in order to obtain visual features to be used in a deep learning process.

11. The method of claim 1, wherein the enriching of the data/features to enrich input raw data uses autoregressive models.

12. The method of claim 1, wherein the enriching of the data/features uses coefficients of bi-dimensional autoregressive models obtained from estimated wrist's attitude roll and pitch angles.

13. The method of claim 1, wherein the enriching of the data/features uses time-domain autoregressive models.

14. The method of claim 1, wherein the enriching of the data/features uses phase plane autoregressive models.

15. The method of claim 1, wherein the learning of the features/classifier is based on shallow classifiers, such classifiers comprising Support Vector Machine, Random Forest, Nearest Neighbors, Naïve Bayes and Neural Networks.

16. The method of claim 1, wherein the learning of the features/classifier is based on deep classifiers, such classifiers comprising Convolutional Neural Networks, Recurrent Neural Networks, or other types of deep learning architectures.

17. The method of claim 1, wherein results of the outputting of the classification information are stored in a user profile.

18. The method of claim 1, wherein results of the outputting of the classification information are displayed to a user in a visual interface.

19. A system for recognition of sensor data to obtain enriched data for a learning process based on mobile inertial sensors, the system comprising:
   a memory;
   a processor coupled to the memory and the processor configured to:
      receive data from the mobile inertial sensors stimulated by a user;
      obtain data/features from input raw sensor data that is received as the data from the mobile inertial sensors;
      enrich the data/features obtained from the input raw data from the mobile inertial sensors by performing pre-processing in association with the data/features obtained from the input raw sensor data and generate enriched data for use in the learning process;
      learn features and classifier based on the input raw sensor data together with the generated enriched data as input for the learning process; and
      analyze a classification information generated according to the features and classifier.

* * * * *

UNITED STATES PATENT AND TRADEMARK OFFICE
CERTIFICATE OF CORRECTION

PATENT NO. : 11,386,598 B2
APPLICATION NO. : 16/033847
DATED : July 12, 2022
INVENTOR(S) : Otávio A. B. Penatti et al.

Page 1 of 1

It is certified that error appears in the above-identified patent and that said Letters Patent is hereby corrected as shown below:

On the Title Page

Column 1, at item (71) Line 2, delete "Capinas (BR);" and insert --Campinas (BR);--.

Signed and Sealed this
Eleventh Day of October, 2022

Katherine Kelly Vidal
*Director of the United States Patent and Trademark Office*